United States Patent
Babb (10) Patent No.: US 8,730,627 B2
(45) Date of Patent: May 20, 2014

(54) DECREASING VOLTAGE DETECTION WITH CONTROL SIGNALING

(75) Inventor: Sam Babb, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 13/263,942

(22) PCT Filed: Jun. 8, 2009

(86) PCT No.: PCT/US2009/046611
§ 371 (c)(1),
(2), (4) Date: Oct. 11, 2011

(87) PCT Pub. No.: WO2010/144077
PCT Pub. Date: Dec. 16, 2010

(65) Prior Publication Data
US 2012/0026633 A1    Feb. 2, 2012

(51) Int. Cl.
*H02H 9/00* (2006.01)
(52) U.S. Cl.
USPC ............................................. 361/56
(58) Field of Classification Search
USPC ............................................. 361/56
See application file for complete search history.

(56) References Cited

U.S. PATENT DOCUMENTS

| | | | | |
|---|---|---|---|---|
| 3,868,552 A | * | 2/1975 | Wickson | 361/104 |
| 4,215,386 A | * | 7/1980 | Prager et al. | 361/679.4 |
| 4,571,658 A | * | 2/1986 | Ruta | 361/96 |
| 4,678,984 A | * | 7/1987 | Henze | 323/285 |
| 6,992,463 B2 | * | 1/2006 | Yoshio | 320/134 |
| 2002/0190701 A1 | * | 12/2002 | Miyazaki | 323/284 |
| 2007/0064370 A1 | * | 3/2007 | Kajiwara | 361/103 |
| 2008/0042618 A1 | * | 2/2008 | Cromer et al. | 320/134 |

FOREIGN PATENT DOCUMENTS

| | | | | |
|---|---|---|---|---|
| JP | 09-051670 A | | 2/1997 | |
| JP | 09051670 A | * | 2/1997 | ............ H02M 3/155 |

* cited by examiner

*Primary Examiner* — Jared Fureman
*Assistant Examiner* — Kevin J Comber (57) ABSTRACT

Illustrative circuits and methods are provided. Circuitry is configured to detect a decrease in a monitored voltage at greater than a threshold rate. A fuse is deliberately blown in response to the detection. Power control circuitry is disabled and prevented from resuming normal operations by way of control signaling. The blown fuse ensures that at least one control signal is maintained until the blown fuse is replaced by service personnel. Shunt circuitry optionally discharges storage capacitors of the power control circuitry. Sensitive electronic components are protected against over-voltage or overcurrent damage in accordance with the present teachings.

14 Claims, 6 Drawing Sheets

DECREASING VOLTAGE DETECTION WITH CONTROL SIGNALING

BACKGROUND

Numerous electronic devices use one or more converters to shift electrical voltage from a source level to a lesser operating level as required by various components such as integrated circuits, sensors, etc. Sometimes, a failure within an electronic device disrupts the source voltage level, resulting in a loss of output voltage regulation by the one or more converters. In turn, sensitive components can be exposed to unregulated voltages or excessive currents resulting in permanent damage and expensive replacement costs.

Accordingly, the embodiments described hereinafter were developed in view of the foregoing and related concerns.

BRIEF DESCRIPTION OF THE DRAWINGS

The present embodiments will now be described, by way of example, with reference to the accompanying drawings, in which.

DETAILED DESCRIPTION

Introduction

Means and methods for protecting electronic circuitry against over-voltage and over-current damage are provided by the present teachings. Circuitry is configured to detect a decrease in a monitored voltage at greater than a threshold time-rate-of-change. A fuse is deliberately blown in response to the detection. Power control circuitry is disabled and prevented from resuming normal operations by way of the control signaling. The blown fuse ensures that at least one control signal is maintained until the blown fuse is replaced by service personnel. Shunt circuitry optionally discharges storage capacitors of the power control circuitry. Sensitive electronic components are thus protected against in accordance with the present teachings.

In one embodiment, an apparatus includes circuitry configured to detect a decrease in a voltage at greater than a threshold time rate of change, and to forcibly blow an electrical fuse in response to the detection. The circuitry is further configured to provide at least one control signal in response to the blown fuse.

In another embodiment, an electronic device includes sense circuitry configured to detect a decrease in an electrical voltage in excess of a threshold time rate of change. The sense circuitry is also configured to assert a disable signal and a shunt signal in response to the detection. The electronic device also includes power circuitry configured to electrically isolate one or more buffer capacitors from a source of electrical energy in response to the assertion of the disable signal. The electronic circuitry further includes shunt circuitry configured to electrically discharge the one or more buffer capacitors in response to the assertion of the shunt signal.

In yet another embodiment, a method performed by way of electronic circuitry, the method including detecting a negative time rate of change in an electrical voltage in excess of a threshold value. The method also includes blowing an electrical fuse in response to the detection by way of an electrical current. The method further includes electrically isolating one or more electronic components from a source of electrical energy in response to the blown condition of the electrical fuse.

First Illustrative Apparatus

Figure 1:
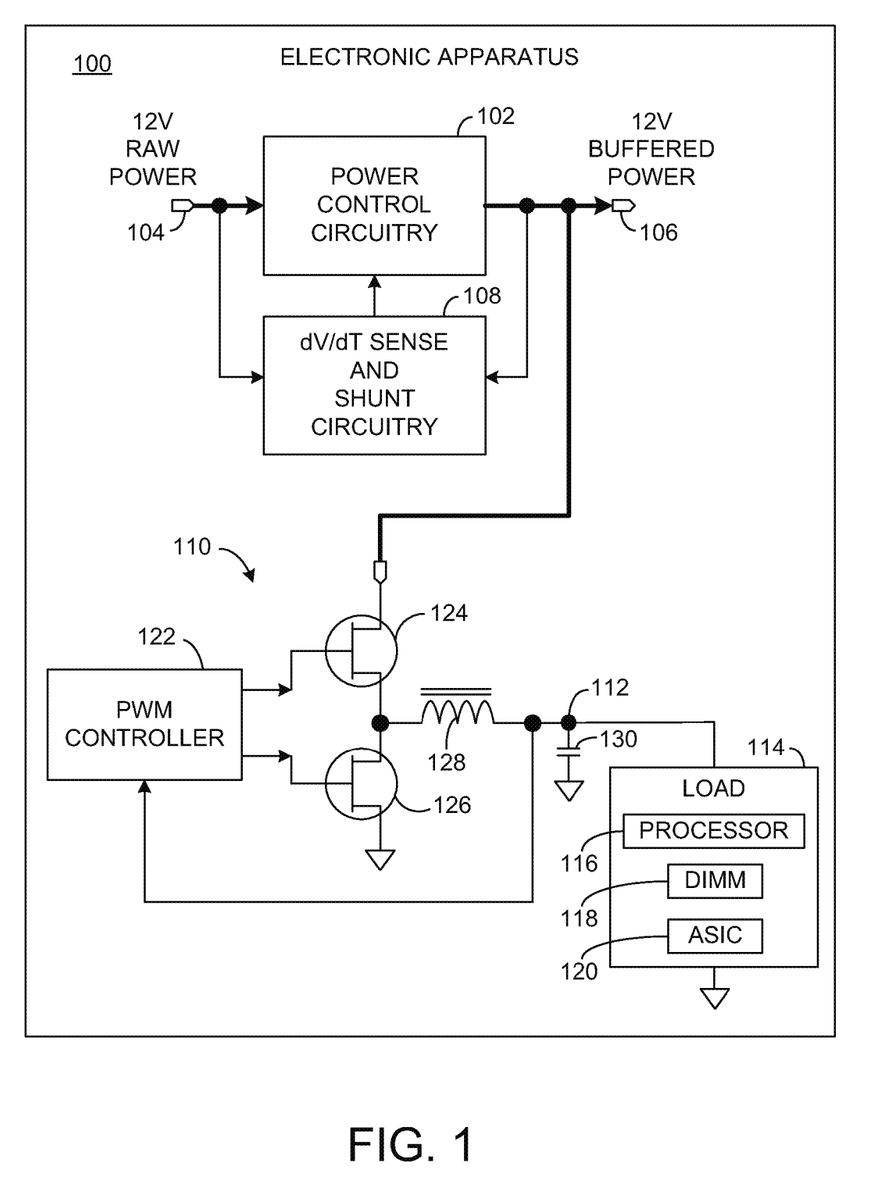
FIG. 1 depicts a block diagram of an apparatus according to one embodiment.

FIG. 1 depicts a block diagrammatic view of an electronic apparatus 100 according to one embodiment. The apparatus 100 is intended to provide a context for understanding the present teachings. As such, the apparatus 100 is illustrative and non-limiting in nature. Other apparatus or devices including some or all of the present teachings are also contemplated.

The apparatus 100 includes power control circuitry 102. The power control circuitry 102 is coupled to a source of "raw" electrical energy at a node 104, and provides buffered (i.e., filtered) electrical energy at a node 106. For purposes of the present teachings, raw electrical energy refers to electrical potential that is not stored in substantial quantities or sufficiently filtered as required by the other (load) circuitry of the apparatus 100. Further elaboration on the power control circuitry 102 is described hereinafter.

The apparatus 100 also includes time-rate-of-change (i.e., dV/dT) detection and shunt circuitry 108, also referred to as sense circuitry 108. The sense circuitry 108 is coupled to electrical energy at node 104, and is coupled to monitor the buffered voltage provided at node 106. The sense circuitry 108 is configured to detect a decrease in the buffered voltage at node 106 that exceeds a predetermined (or threshold) time-rate-of-change. That is, the sense circuitry 108 is configured detect a negative time derivative of the buffered voltage at node 106 and to provide one or more control signals in response thereto. Further elaboration on the power sense circuitry 108 is described hereinafter.

The apparatus 100 additionally includes a power converter 110. The power converter 110 can also be referred to as a direct current (i.e., DC) to direct current converter. The power converter 110 is coupled to receive buffered electrical energy at node 106 and to provide electrical voltage at a lower, regulated potential at a node 112. The electrical voltage at the node 112 is coupled to an illustrative load 114, which includes a processor 116, a dual in-line memory module (DIMM) 116 and an application specific integrated circuit (ASIC) 118. The load 114 can further include any number or type of other components, devices, circuitry or electrical loads energized by the regulated voltage at the node 112.

Normal illustrative operation of the electronic apparatus 100 proceeds as follows: twelve volts DC of "raw" electrical potential is present at node 104. Such voltage at node 104 can be provided, for non-limiting example, by an external power supply (not shown), a DC bus rail of a computer server chassis, etc. The particular source of the potential at node 104 is not germane to an understanding of the present teachings. The power control circuitry 102 couples the potential at node 104 to one or more buffer capacitors (see FIG. 2) by way of one or more pass transistors (see FIG. 2) and the buffered electrical energy is provided at node 106.

The power converter 110 receives the buffered voltage at node 106 and operates to provide a lower DC potential at node 112 by way of a "buck" switching conversion process. There under, a pulse width modulation (PWM) controller 122 provides respective signals to an upper transistor 124 and a lower transistor 126 so as control the bidirectional flow of electrical current through an inductor 128. A capacitor 130 filters the output voltage from the power converter 110 as provided at the node 112. The PWM controller 122 monitors the voltage at the node 112 as a feedback signal in order to provide proper output regulation. In turn, the load 114 is coupled to the regulated electrical voltage at the node 112. One having ordinary skill in the electrical arts appreciates the general nature of switching-type voltage conversion, and further elaboration is not needed.

It is now assumed, for purposes of illustration, that a problem occurs within the electronic apparatus 100 such that the buffered voltage at node 106 begins to decrease (i.e., sag or decay) at a significant rate. Such a problem can occur, for example, as a result of a faded electrical component. The buffered voltage at node 106 can decrease to a level at which the PWM controller 122 will malfunction and proper control of the transistors 124 and 126 is lost. Under these conditions, the load 114 can be uncontrollably coupled to the buffered voltage at node 106 by way of the inductor 128, leading to an over voltage condition and component destruction (e.g., processor 116, ASIC 120, etc.).

Continuing the illustrative failure scenario, the sense circuitry 108 is presumed to detect the decreasing voltage at node 106 and respond by providing one or more control signals to the power control circuitry 102. The power control circuitry 102 responds to the one or more control signals by electrically isolating the output node 106 from the source of raw power at node 104. Additionally, the sense circuitry 108 includes shunt circuitry that rapidly discharges the one or more buffer capacitors (see FIG. 2) of the power control circuitry 102. The various components of the load 114 are thus protected against over voltage or excess current damage by virtue of the sense circuitry 108 operations.

Furthermore, the sense circuitry 108 continuously asserts the disable signal until such time as the underlying problem with the electronic apparatus 100 is corrected by appropriate service personnel. The sense circuitry 108 provides this continuous protection action by virtue of an electrical fuse that is intentionally blown (i.e., opened or electrically destroyed), until such time as the fuse is replaced. The operation of this fuse is described in further detail hereinafter.

The apparatus 100 and the operating sequence described immediately above are illustrative and non-limiting with respect to the present teachings. The apparatus 100 can be defined, in whole or in part, by a circuit card of a blade-type server. Alternatively, the apparatus 100 can be defined, in whole or in part, by a computer, a control system, a communications device, or any other electronic entity in need of component protection.

First Illustrative Embodiment

Figure 2:
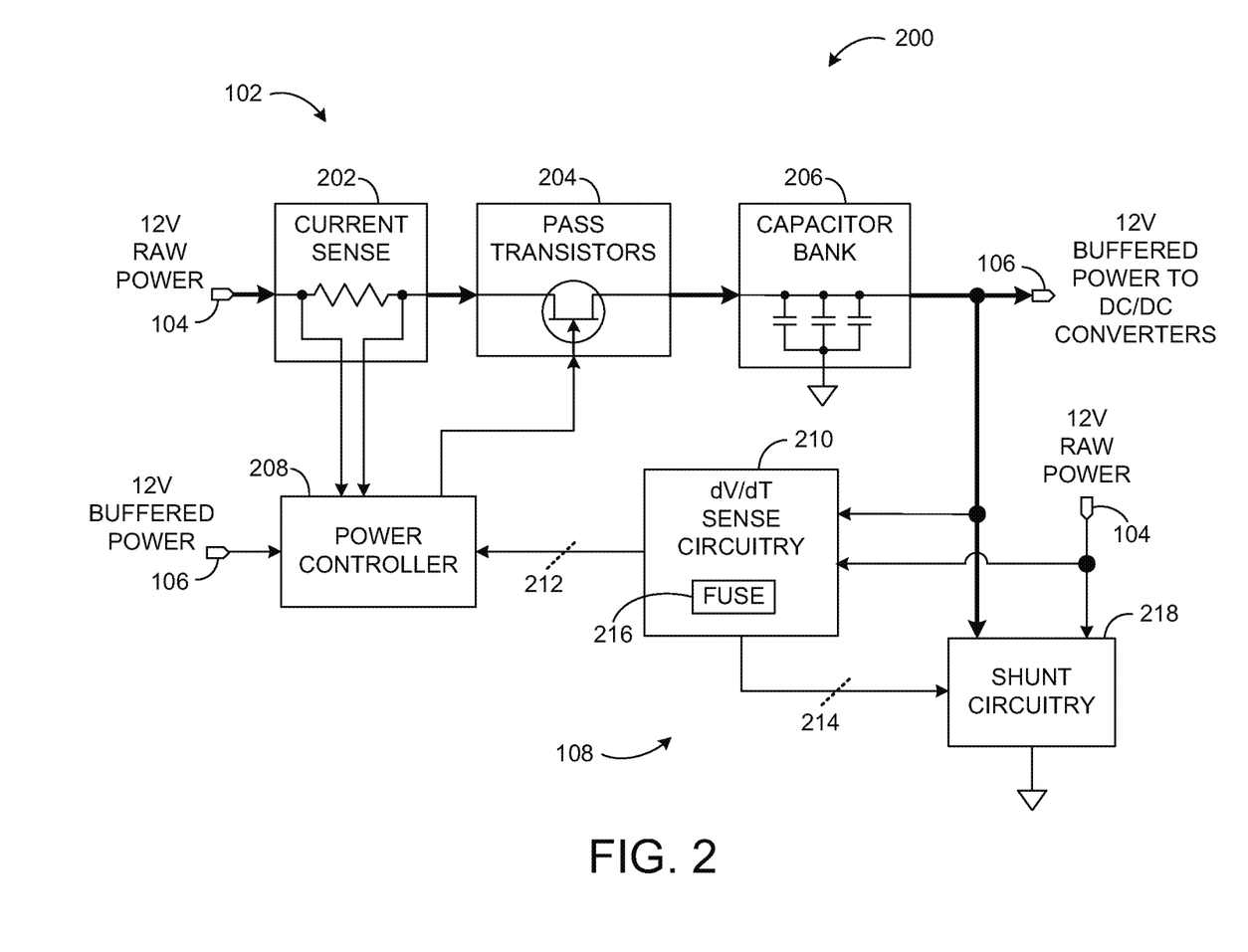
FIG. 2 depicts a block schematic view of electronic circuitry according to one embodiment.

Attention is now directed to FIG. 2, which depicts a block schematic view of electronic circuitry 200 according to one embodiment. The circuitry 200 is illustrative and non-limiting in nature, and other embodiments are also contemplated in accordance with the present teachings.

The circuitry 200 includes a current sense component (or components) 202 that is/are coupled to a source of raw electrical power at a node 104. The current sense device 202 is configured to exhibit an electrical voltage there across in proportion to an electrical current flowing there through. In one embodiment, the current sense device 202 is defined by one or more precision resistive elements. Other suitable components can also be used. The circuitry 200 also includes one or more pass transistors 204 configured to couple electrical energy flowing through the current sense device 202 to a capacitor bank 206. The one or more pass transistors 204 are operated by way of control signals provided by a power controller 208.

The capacitor bank 206 includes one or more capacitors electrically coupled in parallel arrangement that receive electrical current by way of the one or more pass transistors 204. While three capacitors are depicted in the interest of simplicity of understanding, any suitable number can be used. The capacitor bank 206 operates to buffer (i.e., store and release, or filter) the incoming raw power at node 104 and to provide such buffered electrical energy at node 106. Thus, the capacitor bank 206 can also be referred to as a bank (or subsystem) of buffer capacitors. The buffered electrical voltage at node 106 is available to be coupled to any number of various electrical loads, such as one or more DC-to-DC converters (e.g., power converter 110), motors, various circuits and devices, etc.

The circuitry 200 also includes the power controller 208. The power controller 208 is configured to monitor the buffered power at node 106, as well as the electrical current flowing through current sense device 202. In turn, the power controller 208 is configured to provide one or more control (i.e., throttling) signals to the pass transistors 204 so as to regulate the voltage and current at node 106. The power controller 208 can be defined by any suitable circuitry, integrated circuitry, microcontroller, etc. configured to operate in accordance with the present teachings. In one embodiment, the power controller 208 is at least partially defined by a model LTC4215 "Hot Swap" Controller as available from Linear Technology Corp., Milpitas, Calif., USA. Other suitable power controllers can also be used.

The circuitry 200 also includes sense circuitry 210. The sense circuitry 210 can also be referred to as dV/dT (i.e., time derivative) sense circuitry. The sense circuitry 210 is configured to detect a negative (or decreasing) time-rate-of-change in voltage at the node 106 beyond a threshold level and to assert at least two corresponding control signals. In one embodiment, the sense circuitry 210 is configured to respond if the voltage decreases at greater than −0.025 Volts per microsecond. Other suitable detection thresholds, being of positive (i.e., increasing voltage) or negative (i.e., decreasing voltage) time-rates-of-change, can also be used. As depicted, the sense circuitry 210 provides a disable signal 212 and a shunt signal 214. Additional or other signals can also be asserted. The sense circuitry 210 is configured to intentionally blow (i.e., disable) a fuse 216 in response to a voltage decrease detection, resulting in the continuous assertion of at least one of the signals signal 212 and 214 until the fuse 216 is replaced.

The circuitry 200 further includes shunt circuitry 218. The shunt circuitry is configured to respond to an assertion of the shunt signal 214 by coupling node 106 to ground potential by way of a low-resistance load. In this way, the electrical energy stored within the capacitor bank 206 is rapidly discharged to ground, serving to protect load components (i.e., load 114) from over voltage or over current damage. Typical normal operation of the circuitry 200 is now described with reference to the flow diagram of FIG. 3.

First Illustrative Method

Figure 3:
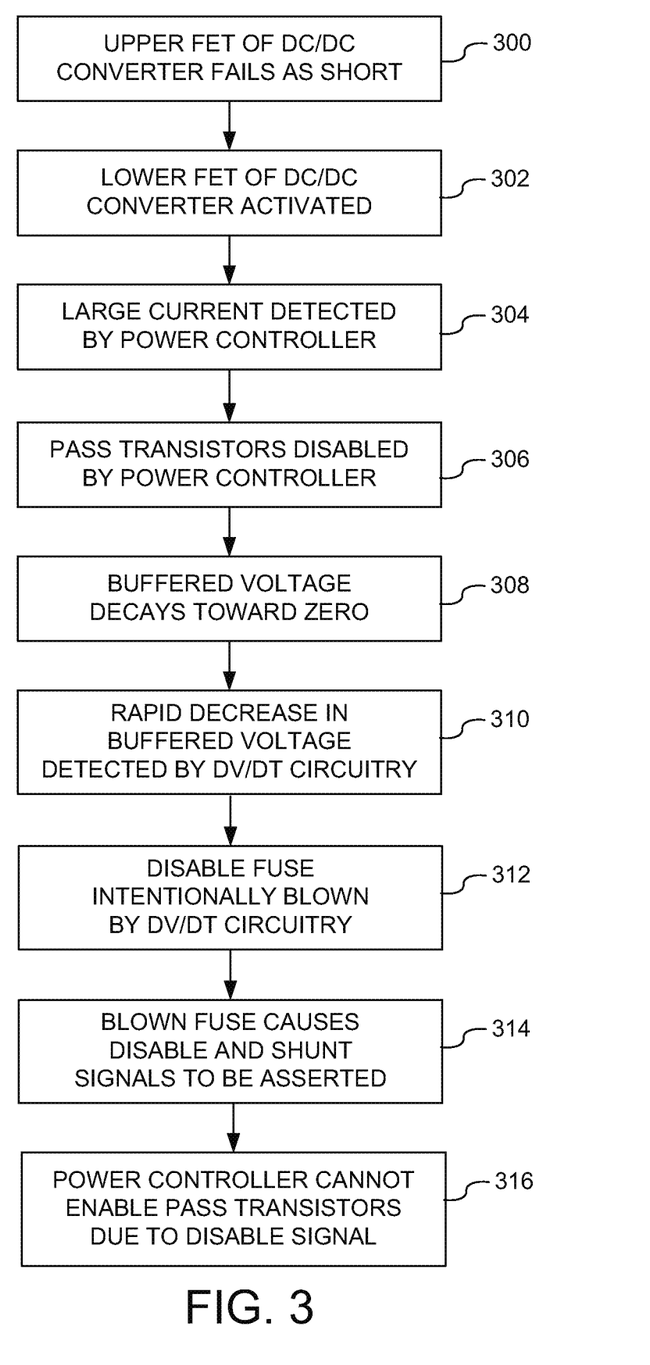
FIG. 3 depicts a flow diagram of a method according to an embodiment.

FIG. 3 is a flow diagram depicting a method in accordance with another embodiment. FIG. 3 depicts particular operations and order of execution. However, it is to be understood that other methods respectively including other steps, excluding particular steps, and/or proceeding in other orders of execution can be performed in accordance with the present teachings. Thus, the method of FIG. 3 is illustrative and non-limiting in nature. The method will be described with reference to FIGS. 1 and 2 for purposes of illustration.

At 300, an upper field-effect transistor (FET) of a DC-to-DC converter fails as an electrical short. For purposes of non-limiting illustration, it is assumed that the transistor 124 of the power converter 110 fails in an electrically shorted condition.

At 302, the pulse-width modulation controller of the DC-to-DC converter reacts to the increasing output voltage by activating a lower FET. For purposes of illustration, it is assumed that the PWM controller 122 signals the transistor 126 into a conductive state.

At 304, a large load current is detected by power control circuitry. For purposes of ongoing illustration, it is assumed that the power controller 208 of the power control circuitry 102 detects an abnormal current flow toward node 106 by way of the current sense device 202.

At 306, the power control circuitry disables one or more pass transistors so as to cease the flow of electrical current. For purposes of ongoing illustration, it is assumed that the power controller 208 signals the one or more pass transistors 204 into a non-conductive (disabled) state. It is further assumed that such a disabled state would, under other circumstance, be temporary and that the power controller 208 would reactivate the pass transistors 204 once the over-current condition has ended.

At 308, the buffered voltage at the output of the power control circuitry begins to decay toward zero volts. For purposes of ongoing illustration, it is assumed that the voltage at node 106 begins to decrease at a substantial rate.

At 310, the decrease in output voltage is detected by time-rate-of-change detection circuitry. For purpose of illustration, the sense circuitry 210 is presumed to detect a sag in the voltage at node 106 at rate greater in absolute value than a predetermined detection threshold.

At 312, the time-rate-of-change detection circuitry intentionally and forcibly blows a fuse in response to the detection at 310 above. For purpose of illustration, the sense circuitry 210 blows the fuse 216 by way of a controllably applied electrical current.

At 314, the fuse blown at 312 above causes the time-rate-of-change detection circuitry to assert a disable signal and a shunt signal. For purpose of illustration, the sense circuitry 210 asserts the disable signal 212 and the shunt signal 214. Furthermore, at least the disable signal 212 is continuously asserted for so long as sufficient electrical energy is provided at node 104 and the fuse 216 remains in a blown condition.

At 316, the power control circuitry is prevented from re-enabling the pass transistors due to the influence of the asserted disable signal. For purpose of the ongoing illustration, it is assumed that the power controller 208 is prevented from signaling the pass transistors 204 into a conductive state by virtue of the asserted disable signal 212. R is further assumed that the shunt circuitry 218 activated by way of the shunt signal 214 and that the capacitor bank 206 is rapidly discharged in response.

The method of FIG. 3 depicts a particular, illustrative failure mode (i.e., shorting of the transistor 124) that results in the protective actions of the sense circuitry 210 and the shunt circuitry 218. However, it is to be understood that other particular failures can also occur, resulting in a substantially identical protective response in accordance with the present teachings. It is noted that the fuse 216, when in a blown condition, causes the sense circuitry 218 to assert the disable signal 212 (and optionally the shunt signal 214) in a continuous manner until the blown fuse 216 is replaced. As such, attempts to reactivate the power control circuitry 102 by manual restart or other means are futile until the electronic apparatus 100 has been serviced by appropriate personnel. In this way, delicate components of the load 114 are continuously protected until the underlying problem (e.g., failed transistor 124) has been addressed and the blown fuse 216 has been replaced.

Second Illustrative Embodiment

Figure 4:
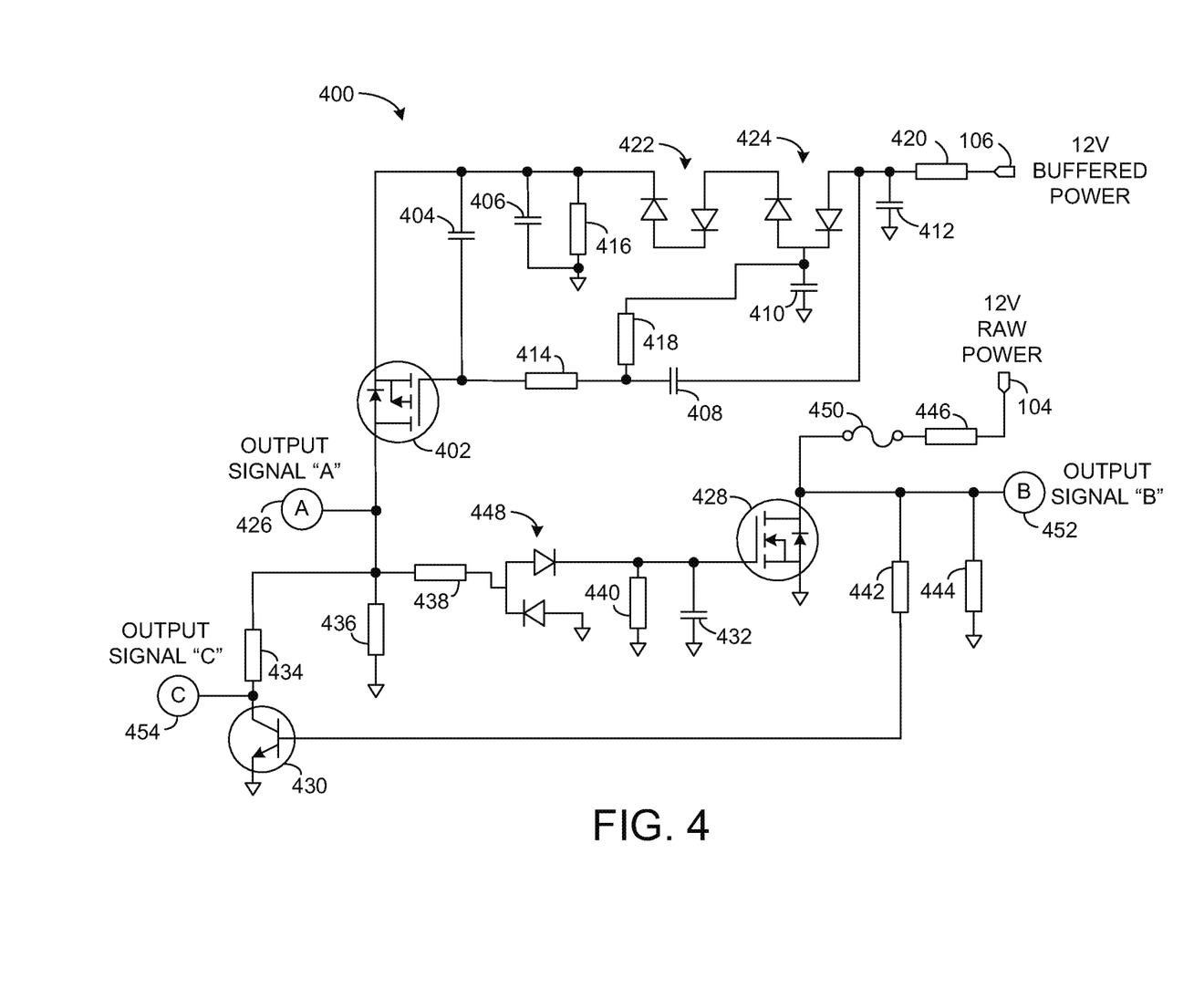
FIG. 4 depicts schematic view of electronic circuitry according to an embodiment.

FIG. 4 is a schematic diagram depicting a time-rate-of-change sensing circuit 400 according to an embodiment. The sensing circuit 400 is illustrative and non-limiting with respect to the present teachings. Other sensing circuits can also be used. The sensing circuit 400 is coupled to a source of raw electrical energy at the node 104, as well as to buffered electrical voltage at the node 106.

The sensing circuit 400 includes transistor 402, capacitors 404-412 (inclusive), resistors 414-420 (inclusive) and diode pairs 422 and 424. The circuit components 402-424 are configured to detect a significant negative (decrease) time-rate-of-change in the buffered voltage at node 106 and to assert an output signal "A" at a node 426 "high" (i.e., toward twelve volts). During times of normal operation, the signal "A" at node 426 is essentially floating in a "hi-Z" (high impedance) state.

The sensing circuit 400 also includes a transistor 428, a transistor 430, a capacitor 432, resistors 434-446 (inclusive), a diode pair 448 and a fuse 450. The circuit components 428-450 are configured to operate as follows: under normal conditions, the voltage at node 426 is in a "low" condition and the transistor 428 is in a generally non-conductive state. As a result, electrical potential at the node 104 biases an output signal "B" at a node 452 "high". In turn, the transistor 430 is in a generally conductive state and an output signal "C" at a node 454 is biased "low".

When a significant voltage drop event is detected, the transistor 402 operates to drive the signal "A" at node 426 "high". In turn, the transistor 428 is driven into conduction and the fuse 450 is deliberately blown by way of excessive electrical current there through. The blown state of fuse 450 causes the signal "B" at node 452 to be biased "low", while the signal "C" at node 454 is in a "low" condition. The blown condition of the fuse 450 maintains signal "B" in a "low" logic state, regardless of restoration of normal power conditions, until the blown fuse 450 is replaced.

Table 1 below summarizes operating states and signal levels within the sense circuitry 400 during normal, voltage drop detection (−dV/dT), and blown fuse conditions:

TABLE 1

Signal States for Sensing Circuit 400

| Element | Normal | −dV/dT | Blown Fuse |
| --- | --- | --- | --- |
| Signal "A" 426 | Low | High | Low |
| Signal "B" 452 | High | Low | Low |
| Signal "C" 454 | Low | High | Low |

Illustrative and non-limiting values for the components of the time-rate-of-change sensing circuit 400 are summarized below in Table 2. Other suitable values can also be used:

TABLE 2

Sensing Circuit 400

| Element/Device | Value/Model | Notes/Vendor |
|---|---|---|
| Transistor 402 | FDC6333C | Fairchild Semiconductor |
| Capacitor 404 | 0.1 uF | (any) |
| Capacitor 406 | 22 uF | (any) |
| Capacitor 408 | 0.1 uF | (any) |
| Capacitor 410 | 22 uF | (any) |
| Capacitor 412 | 0.01 uF | (any) |
| Resistor 414 | 22.0 Ohms | (any) |
| Resistor 416 | 4.3K Ohms | (any) |
| Resistor 418 | 3.3K Ohms | (any) |
| Resistor 420 | 10.0 Ohms | (any) |
| Diode Pair 422 | BAV99 | Fairchild Semiconductor |
| Diode Pair 424 | BAV99 | Fairchild Semiconductor |
| Transistor 428 | FDC6333C | Fairchild Semiconductor |
| Transistor 430 | PMBT3904 | Philips Semiconductors |
| Capacitor 432 | 0.01 uF | (any) |
| Resistor 434 | 1K Ohms | (any) |
| Resistor 436 | 1K Ohms | (any) |
| Resistor 438 | 49.9 Ohms | (any) |
| Resistor 440 | 100K Ohms | (any) |
| Resistor 442 | 3.4K Ohms | (any) |
| Resistor 444 | 4.75K Ohms | (any) |
| Resistor 446 | 10.0 Ohms | (any) |
| Diode Pair 448 | BAV99 | Fairchild Semiconductor |
| Fuse 450 | 0.25 Amps | (any) |

Third Illustrative Embodiment

Figure 5:
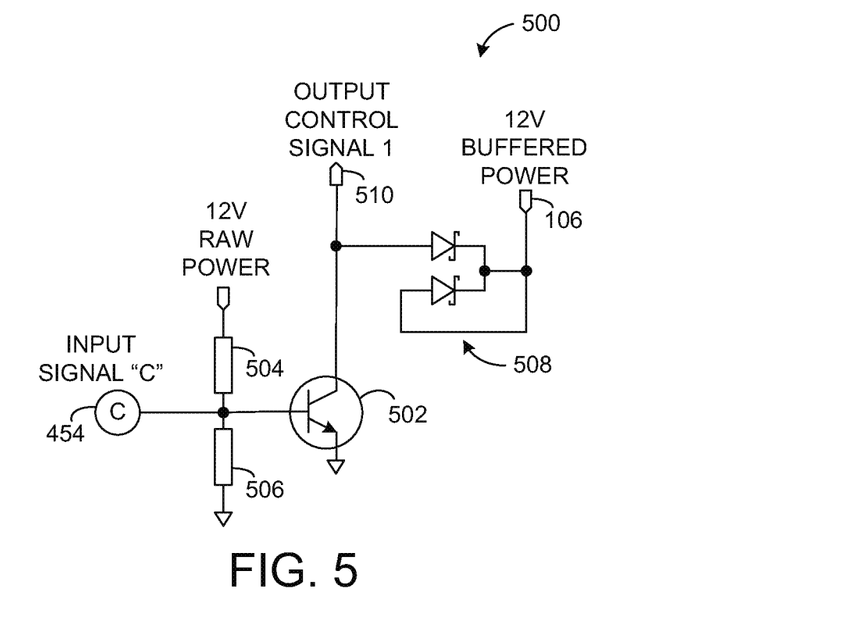
FIG. 5 depicts schematic view of electronic circuitry according to an embodiment.

FIG. 5 is a schematic diagram depicting a signal inverter circuit 500 according to an embodiment. The inverter circuit 500 is illustrative and non-limiting with respect to the present teachings. Other inverter circuits can also be used. The sensing circuit 500 is coupled to buffered electrical energy at the node 106.

The inverter circuit 500 includes transistor 502, resistors 504-506 (inclusive) and Schottky barrier diode pair 508. The circuit components 502-508 are configured to assert (bias) an output signal at a node 510 "high" during normal operating conditions while the signal "C" at node 454 is asserted "low".

During detection of a rapid buffered voltage decrease (i.e., –dV/dT), the signal "C" at node 454 is asserted "high" and the output signal at node 510 is asserted "low". The output signal at node 510 remains "low" while the fuse 450 (FIG. 4) is in a blown condition. Illustrative and non-limiting values for the components of the inverting circuit 500 are summarized below in Table 3. Other suitable values can also be used:

TABLE 3

Inverting Circuit 500

| Element/Device | Value/Model | Notes/Vendor |
|---|---|---|
| Transistor 502 | PBMT3904 | Philips Semiconductors |
| Resistor 504 | 10K Ohms | (any) |
| Resistor 506 | 3.4K Ohms | (any) |
| Diode Pair 508 | BAT54C | Fairchild Semiconductor |

Fourth Illustrative Embodiment

Figure 6:
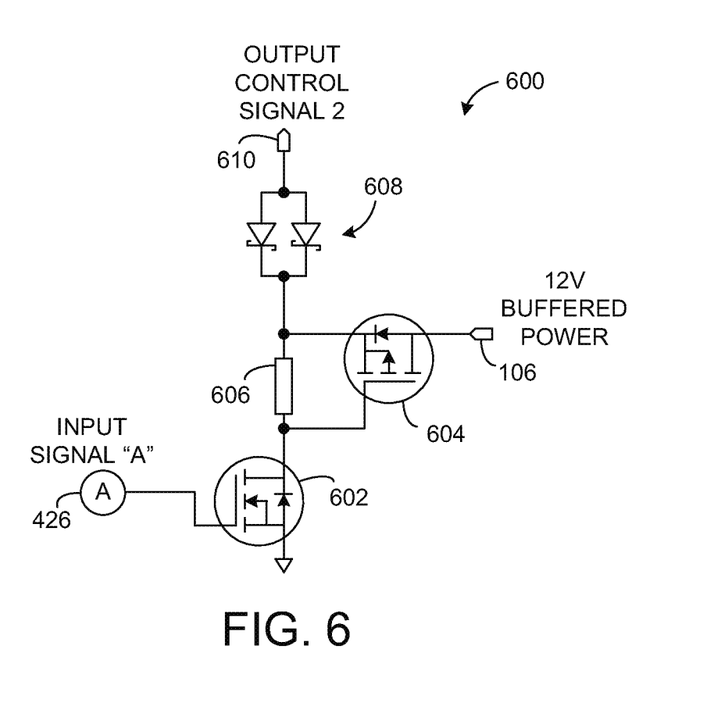
FIG. 6 depicts schematic view of electronic circuitry according to an embodiment.

FIG. 6 is a schematic diagram depicting a signal buffering circuit 600 according to an embodiment. The buffering circuit 600 is illustrative and non-limiting with respect to the present teachings. Other buffering circuits can also be used. The buffering circuit 600 is coupled to buffered electrical energy at the node 106.

The buffering circuit 600 includes transistors 602 and 604, resistor 606, and Schottky barrier diode pair 608. During normal operating conditions, an output signal at a node 610 is asserted "high" while the input signal "A" at node 426 is asserted "low".

During detection of a rapid buffered voltage decrease (i.e., –dV/dT), the signal "A" at node 426 is asserted "high" and the output signal at node 610 is asserted "high". Illustrative and non-limiting values for the components of the buffering circuit 600 are summarized below in Table 4. Other suitable values can also be used:

TABLE 4

Buffering Circuit 600

| Element/Device | Value/Model | Notes/Vendor |
|---|---|---|
| Transistor 602 | FDC6333C | Fairchild Semiconductor |
| Transistor 604 | FDC6333C | Fairchild Semiconductor |
| Resistor 606 | 22K Ohms | (any) |
| Diode Pair 608 | BAT54C | Fairchild Semiconductor |

Fifth Illustrative Embodiment

Figure 7:
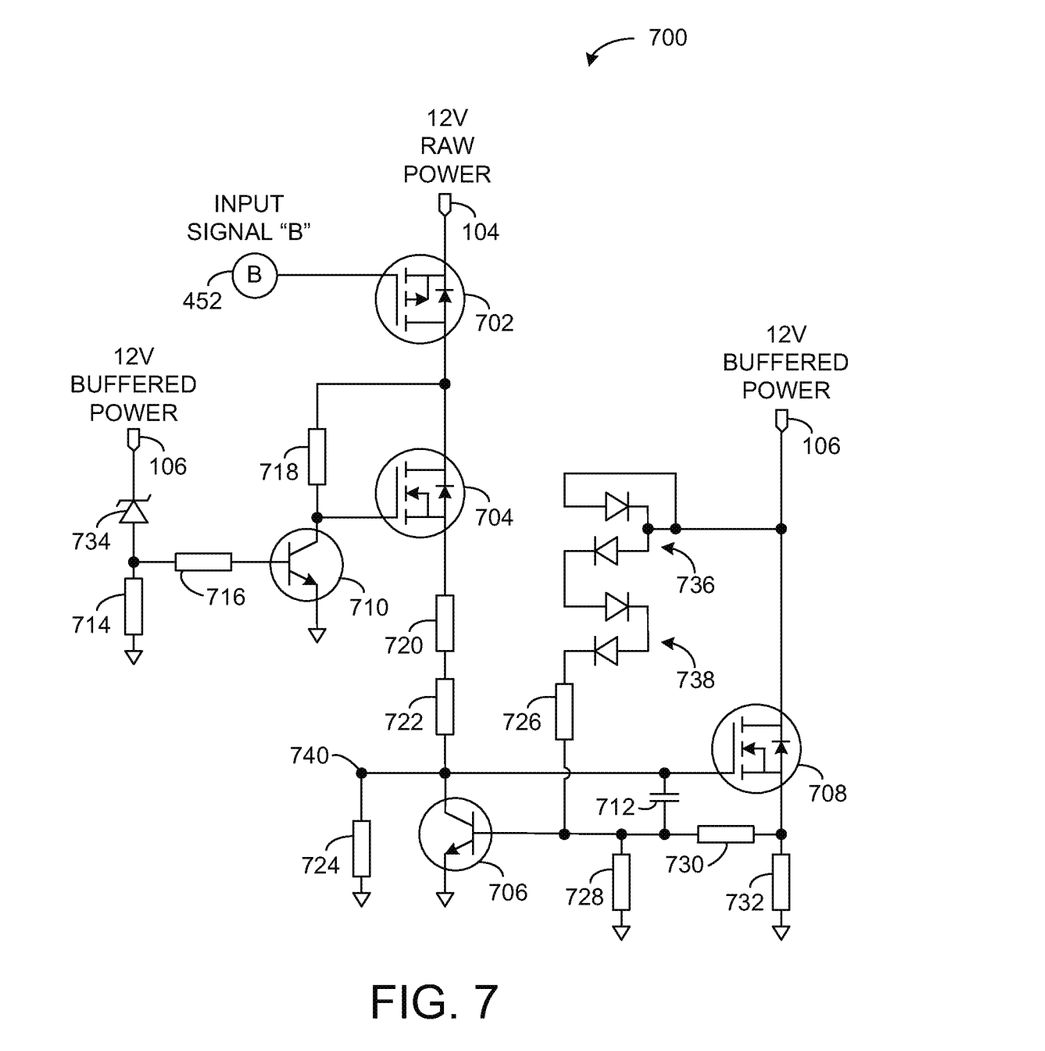
FIG. 7 depicts schematic view of electronic circuitry according to an embodiment.

FIG. 7 is a schematic diagram depicting a shunt circuit 700 according to an embodiment. The shunt circuit 700 is illustrative and non-limiting with respect to the present teachings. Other shunt circuits can also be used. The shunt circuit 700 is coupled to raw electrical energy at the node 104, and to buffered electrical energy at the node 106.

The shunt circuit 700 includes transistors 702-710 (inclusive), capacitor 712, resistors 714-732 (inclusive), zener diode 734, and diode pairs 736 and 738. During normal operating conditions, an input signal "B" at the node 452 is asserted "high" and the transistor 702 is in an essentially non-conductive state. As such, the potential at a node 740 is also "low" and the (shunt) transistor 708 is in a substantially non-conductive state.

During detection of a rapid buffered voltage decrease (i.e., –dV/dT), and while the fuse 450 is in a blown condition, the signal "B" at node 452 is asserted "low". In response, the transistor 702 is conductive and the potential at node 740 is pulled "high". In turn, the shunt transistor 708 is driven into conduction and current is shunted from node 106 through low-value load resistor 732. This shunt action has the effect of rapidly discharging any electrical energy stored within buffer capacitor bank 206 (see FIG. 2). Transistor 706 and related components provide negative feedback so as to regulate (or limit) the shunt current value.

Illustrative and non-limiting values for the components of the shunt circuit 700 are summarized below in Table 5. Other suitable values can also be used:

TABLE 5

Shunt Circuit 700

| Element/Device | Value/Model | Notes/Vendor |
|---|---|---|
| Transistor 702 | FDC6333C | Fairchild Semiconductor |
| Transistor 704 | FDC6333C | Fairchild Semiconductor |
| Transistor 706 | PBMT3904 | Philips Semiconductor |
| Transistor 708 | NTMFS4833N | ON Semiconductor |
| Transistor 710 | PBMT3904 | Philips Semiconductor |
| Capacitor 712 | 1500 pF | (any) |
| Resistor 714 | 1K Ohms | (any) |
| Resistor 716 | 4.64K Ohms | (any) |
| Resistor 718 | 2.2K Ohms | (any) |

TABLE 5-continued

Shunt Circuit 700

| Element/Device | Value/Model | Notes/Vendor |
| --- | --- | --- |
| Resistor 720 | 221.0 Ohms | (any) |
| Resistor 722 | 221.0 Ohms | (any) |
| Resistor 724 | 2.2K Ohms | (any) |
| Resistor 726 | 2.15K Ohms | (any) |
| Resistor 728 | 2.15K Ohms | (any) |
| Resistor 730 | 316.0 Ohms | (any) |
| Resistor 732 | 0.004 Ohms | (any) |
| Zener Diode 734 | 4.7 V DC | (any) |
| Diode Pair 736 | BAV99 | Fairchild Semiconductor |
| Diode Pair 738 | BAV99 | Fairchild Semiconductor |

In general, the foregoing description is intended to be illustrative and not restrictive. Many embodiments and applications other than the examples provided would be apparent to those of skill in the art upon reading the above description. The scope of the invention should be determined, not with reference to the above description; but should instead be determined with reference to the appended claims; along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
    circuitry configured to detect a decrease in a voltage at greater than a threshold time rate of change and to forcibly blow an electrical fuse in response to the detection, the circuitry further configured to provide at least one control signal in response to the blown fuse,
    wherein the voltage is coupled to an electrical load distinct from the circuitry, the electrical load consuming an average electrical current that is at least twenty times greater than an ampere rating for the electrical fuse.

2. The apparatus according to claim 1, the circuitry further configured to continuously provide the at least one control signal while the fuse is in a blown condition.

3. The apparatus according to claim 1, the circuitry further configured to forcibly blow the electrical fuse by way of an electrical current.

4. The apparatus according to claim 1 further comprising power control circuitry configured to shut off one or more pass transistors in response to the at least one control signal, the one or more pass transistors configured to selectively electrically couple a source of electrical energy to one or more capacitors.

5. The apparatus according to claim 4, the one or more capacitors configured to provide buffered electrical energy to one or more loads of the apparatus.

6. The apparatus according to claim 1, the apparatus defined by a computer.

7. An electronic device, comprising:
    sense circuitry configured to detect a decrease in an electrical voltage in excess of a threshold time rate of change, the sense circuitry also configured to assert a disable signal and a shunt signal in response to the detection;
    power circuitry configured to electrically isolate one or more buffer capacitors from a source of electrical energy in response to the assertion of the disable signal; and
    shunt circuitry configured to electrically discharge the one or more buffer capacitors in response to the assertion of the shunt signal.

8. The electronic device according to claim 7, the sense circuitry further configured to blow an electrical fuse in response to the detection.

9. The electronic device according to claim 8, the sense circuitry further configured such that at least the disable signal is continuously asserted in response to the blown condition of the electrical fuse.

10. The electronic device according to claim 8 further comprising a load electrically coupled to the one or more buffer capacitors, the load not being coupled to the one or more buffer capacitors by way of the electrical fuse.

11. The electronic device according to claim 7, the power circuitry further configured such that the one or more buffer capacitors provide the electrical voltage.

12. The electronic device according to claim 7 defining at least a portion of a computer or a server.

13. A method performed by way of electronic circuitry, the method comprising:
    detecting a negative time rate of change in an electrical voltage in excess of a threshold value;
    blowing an electrical fuse in response to the detection by way of an electrical current; and
    electrically isolating one or more electronic components from a source of electrical energy in response to the blown condition of the electrical fuse,
    wherein the electrical voltage is coupled to the one or more electronic component distinct from the electronic circuitry, the one or more electronic component consuming an average electrical current that is greater than an ampere rating for the electrical fuse.

14. The method according to claim 13 further comprising:
    manually replacing the blown electrical fuse with an intact electrical fuse; and
    electrically coupling the one or more electronic components to the source of electrical energy in response to the intact condition of electrical fuse.

* * * * *